United States Patent Office 3,274,012
Patented Sept. 20, 1966

3,274,012
POLYMERIC COMPOSITION COMPRISING HEXOSE SUGAR AND ALKALI METAL SALTS
Ronald H. Cooper, Clare, and Robert D. Goodenough, Midland, Mich., assignors to The Dow Chemical Company, Midland, Mich., a corporation of Delaware
No Drawing. Filed Dec. 4, 1964, Ser. No. 416,099
9 Claims. (Cl. 106—162)

This application is a continuation-in-part of application Serial No. 99,073, filed March 29, 1961, and now abandoned.

This invention relates to polymeric compositions and more particularly is concerned with improved non-hygroscopic polymeric compositions derived from sugars.

It is a principal object of the present invention to provide a novel polymeric composition by an acid-heat polymerization of sugars.

It is a further object of the present invention to provide a polymeric composition that has very good resistance to degradation from moisture and humidity.

It is another object of the present invention to provide a polymeric composition from sugars that has a fast bake or cure time at moderately elevated temperatures.

It is an additional object of the present invention to provide a cured polymeric composition that is non-acidic in nature.

It is also an object of the present invention to provide a polymeric composition by the heat polymerization of sugars, which composition displays strong adhesive action.

These and other objects and advantages will be apparent from the detailed description presented hereinafter.

In accordance with the present invention, a monosaccharide sugar, e.g., fructose or glucose, is polymerized by heating at moderately elevated temperatures in the presence of an acid salt polymerizing agent selected from the group consisting of alkali metal hydrogen sulfates and alkali metal mono-substituted ortho phosphates.

The resulting polymers, because of their adhesive nature, are useful as bonding agents and find particular use for bonding aggregate materials such as are used in the production of foundry cores, hot tops, shell molds and the like.

Additionally the resins are useful in graphite bonding, for imparting wet strength to paper, as road building materials and in the preparation of porous filters and aerators.

Although monosaccharides themselves may be polymerized, conveniently the monosaccharide sugars, and particularly the hexose compounds are first produced in situ by hydrolysis of di- and trisaccharide sugars such as are present in cane sugar, beet sugar, molasses, corn sugar and the like materials utilizing the same acid salt as hydrolyzer which subsequently at the moderately elevated curing temperatures acts to give polymerization of the monosaccharides. Useful sugars include, for example, glucose, mannose, galactose, fructose, sorbose, sucrose, lactose, maltose, isomaltose, raffinose and the like. Sucrose is an especially useful sugar as it is inexpensive, readily hydrolyzable to the corresponding glucose and fructose monosaccharide hexose and is readily available.

Useful acidic materials for hydrolyzing and polymerizing the sugars are the alkali metal hydrogen sulfates, e.g., sodium hydrogen sulfate and potassium hydrogen sulfate and the alkali metal mono substituted ortho phosphates such as monosodium dihydrogen phosphate and monopotassium dihydrogenphosphate and the like. Sodium bisulfate ($NaHSO_4$) because of its ready availability, low cost and effectiveness as a hydrolyzer and polymerizing agent in the present polymer resin forming system has been found to be particularly useful. These acid materials for use as hydrolyzers and polymerization promoters for the sugars are uniquely operable since they are stable at the curing temperatures employed. On the other hand, other strongly acidic compounds of similar acid strength such as the relatively low boiling aqueous solutions of hydrochloric acid, dilute nitric acid, dilute sulfuric acid, acetic acid and the like are not useful in the present compositions as hydrolyzers and polymerization promoters since they are volatile below the curing temperatures employed. Therefore, they do not remain in contact with the mix components for a sufficiently long period to give the needed hydrolysis of polysaccharides and the subsequent acid promoted polymerization of the resulting monosaccharides.

The relative amounts of the sugar and the alkali metal hydrogen sulfate or alkali metal mono-substituted ortho phosphate salt to be used in these compositions ranges from about 55 to about 65 weight percent sugar and from about 45 to about 35 weight percent acid salt hydrolyzer and polymerization agent. Preferably, the ratio of the mixture, by weight, will contain about 60 parts by weight sugar and about 40 parts by weight of the acid salt material.

Advantageously a substantially inert filler such as corn flour, wheat flour, ground oat hulls, silica flour, ground nut shells and the like for example can be incorporated into the mix prior to curing. The filler material acts both as a thickener for the polymeric composition as well as serves to aid in increasing the bond strength of the polymers. The amount of filler used can range from about 8 to about 20 weight percent of the total composition and preferably from about 10 to about 15 percent of the composition weight.

The actual binder formation is carried out in the presence of water. From about 20 to about 40 weight percent water, based on total weight of the final composition is added to the saccharide-acid salt mixture. Preferably the amount of water will range from about 33 to about 37 weight percent of the total water dampened sugar-acid salt mixture.

The polymer producing compositions are prepared by blending the sugar and alkali metal hydrogen sulfate or alkali metal mono-substituted ortho phosphate material, either alone or in the presence of the filler and then adding the water to temper the mix. Alternatively, all of the mix components including the water can be incorporated into a single mixture and these blended for a period of time sufficient to give a damp, thickened formulation.

Ordinarily, with a mix-muller, for example, the ingredients are substantially homogeneously blended in a matter of minutes.

If desired the alkali metal hydrogen sulfate or alkali metal mono-substituted ortho phosphate can first be dissolved in the water and this solution blended with the sugar. Sodium hydrogen sulfate, when using this latter technique, can be dissolved in hot water to insure that complete solubility is obtained. However, addition of the acid salt material to the sugar in the form of an aqueous slurry also may be done in certain applications.

A solution of the sugar also can be employed in certain applications.

An unexpected advantage of the present invention is that the so-produced blend readily is polymerized into a non-hygroscopic resinous non-acidic polymer by heating, i.e. curing, for a short period of time from about 10 to about 15 minutes over a temperature range of from about 300–500° F. and preferably, at about 400–450° F.

The following examples will serve to illustrate further the present invention but are not meant to limit it thereto.

*Example 1.*—A mixture of about 30 grams of food-grade sucrose, about 20 grams of sodium bisulfate, and about 10 grams of corn flour were dry blended into a substantially homogeneous mixture. Thirty-five grams of water, i.e. about 37 percent of total composition weight, then were incorporated into the mix to provide, after about 10 minutes mixing, a thick, pliable composition. The resulting mass was cured at about 400° F. for about 10 minutes and gave a dry, black, non-hygroscopic, thermoset polymer.

*Example 2.*—A second mix of 30 grams sucrose and 20 grams soduim hydrogen sulfate, without an added filler was blended with 25 grams water, i.e. about 33.3 percent of total composition weight, in much the same manner as described in Example 1. The resulting thickened composition was cured at about 450° F. for about 10 minutes and gave a polymer similar in characteristics to that described in Example 1.

In a manner similar to that described for the foregoing example, a mixture containing about 65 weight percent glucose and about 35 weight percent potassium hydrogen sulfate was blended in the presence of about 33.3 weight percent water based on the total composition weight for about 15 minutes. The resutling moldable product was cured at about 300° F. for about 10 minutes and yielded a dry, black, non-hygroscopic polymer resin.

Likewise, 60 grams fructose was admixed with 40 grams monosodium dihydrogen phosphate in the presence of about 50 grams water. The resulting damp, moldable product was cured at about 500° F. for about 15 minutes thereby yielding a non-hygroscopic resin similar to that disclosed hereinbefore.

Additionally raffinose, maltose, lactose, mannose, galactose and the like can be blended in a similar manner with the alkali metal hydrogen sulfate or alkali metal mono-substituted orthophosphate acid salt materials set forth hereinbefore to yield the desired polymeric resins.

Various modifications can be made in the present invention without departing from the spirit or scope thereof for it is understood that we limit ourselves only as defined in the appended claims.

We claim:
1. A composition for the preparation of a non-hygroscopic thermosetting polymer which comprises; a mixture of from about 55 to about 65 parts by weight of a hexose saccharide sugar and from about 45 to about 35 parts by weight of an acidic salt selected from the group consisting of alkali metal hydrogen sulfates and mono-substituted alkali metal orthophosphates, and water from about 20 to about 40 weight percent as based on the total composition weight.

2. The composition as defined in claim 1 wherein a substantially inert filler of from about 8 to about 20 percent of the composition weight is added thereto.

3. A composition for the preparation of a non-hygroscopic, thermosetting polymer which comprises; a mixture of about 60 weight percent sucrose and about 40 weight percent sodium hydrogen sulfate, and from about 33 to about 37 percent water as based on the total composition weight.

4. The composition as defined in claim 3 and including about 10 weight percent of the total mixture as corn flour filler.

5. A method for the preparation of a thermoset, non-hygroscropic hexose sugar polymer which comprises; mixing from about 55 to about 65 parts by weight of a hexose saccharide sugar and from about 45 to about 35 parts of an acid salt selected from the group consisting of alkali metal hydrogen sulfates and mono-substituted alkali metal orthophosphates, adding to said mixture from about 20 to about 40 weight percent water, said water weight based on the weight of the total composition, blending the water-tempered mixture to produce a substantially homogeneous formulation and curing said formulation at a temperature of from about 300 to about 500° F. for a period of from about 10 to about 15 minutes.

6. The method as defined in claim 5 wherein the acid salt is dissolved in the water and this solution is then added to and blended with the hexose saccharide sugar.

7. The method as defined in claim 5 and incorporating the additional step of adding from about 8 to about 20 percent based on the composition weight, of a substantially inert filler thereto.

8. A method for the preparation of a thermoset, non-hygroscopic hexose sugar polymer which comprises; blending about 60 parts by weight sucrose and about 40 parts by weight sodium hydrogen sulfate in the presence of from about 33 to about 37 percent water based on the total composition weight, and curing said formulation at a temperature of from about 400 to about 450° F. from about 10 to about 15 minutes.

9. The method as defined in claim 8 and including the additional step of incorporating from about 10 to about 15 percent by weight of corn flour into the uncured blend, the weight of said corn flour being based on the total composition weight.

References Cited by the Examiner
UNITED STATES PATENTS

| | | | |
|---|---|---|---|
| 629,066 | 7/1899 | Evershed | 106—162 |
| 2,076,795 | 4/1937 | Seymour | 260—9 |
| 2,215,825 | 9/1940 | Wallace et al. | 260—9 XR |
| 2,322,736 | 6/1943 | Pike | 260—209 |
| 2,387,275 | 10/1945 | Leuck | 260—9 |
| 2,661,298 | 12/1953 | Shanley | 106—162 |
| 2,813,840 | 11/1957 | Salzberg | 260—17.2 |

FOREIGN PATENTS

| | | |
|---|---|---|
| 552,380 | 6/1932 | Germany. |

ALEXANDER H. BRODMERKEL, *Primary Examiner.*

J. H. WOO, *Assistant Examiner.*